(12) United States Patent
Pashkov et al.

(10) Patent No.: US 9,426,257 B1
(45) Date of Patent: Aug. 23, 2016

(54) METHOD FOR LAUNCHING REMOTE APPLICATIONS FROM A MOBILE DEVICE USING CLOUD CACHE

(71) Applicant: Parallels IP Holdings GmbH, Schaffhausen (CH)

(72) Inventors: Ruslan Pashkov, Moscow (RU); Stanislav S. Protassov, Moscow (RU); Serguei M. Beloussov, Singapore (SG); Andrey Pokrovsky, Moscow (RU); Pavel Gashev, Moscow (RU); Alexander Aplemakh, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 252 days.

(21) Appl. No.: 14/015,453

(22) Filed: Aug. 30, 2013

(51) Int. Cl.
*G06F 15/16* (2006.01)
*H04L 29/06* (2006.01)

(52) U.S. Cl.
CPC ........................ *H04L 67/42* (2013.01)

(58) Field of Classification Search
CPC .... H04L 45/00; H04L 67/2842; G06F 19/322
See application file for complete search history.

(56) References Cited

U.S. PATENT DOCUMENTS

| | | | | |
|---|---|---|---|---|
| 6,292,834 B1* | 9/2001 | Ravi | ................ | H04L 29/06027 375/E7.004 |
| 8,595,186 B1* | 11/2013 | Mandyam | ................ | G06F 8/38 707/632 |
| 8,738,858 B1* | 5/2014 | Clark | ................ | G06F 13/28 711/118 |
| 2010/0262953 A1* | 10/2010 | Barboni | ................ | G06F 8/61 717/120 |
| 2012/0110470 A1* | 5/2012 | Mistry | ................ | G06F 3/0488 715/748 |
| 2012/0331457 A1* | 12/2012 | Ryu | ................ | G06F 8/63 717/175 |
| 2013/0145144 A1* | 6/2013 | Newell | ................ | G06F 3/0484 713/100 |
| 2013/0332511 A1* | 12/2013 | Hala | ................ | H04L 67/34 709/203 |
| 2014/0337041 A1* | 11/2014 | Madden | ................ | G06F 19/322 705/2 |

* cited by examiner

*Primary Examiner* — Ramy M Osman
*Assistant Examiner* — SM Z. Islam
(74) *Attorney, Agent, or Firm* — Bardmesser Law Group

(57) ABSTRACT

A method for using a mobile device to access remote host desktop applications. A client mobile device is connected to a remote server (host) over a WAN. The client mobile device launches host desktop applications remotely and loads the application windows onto its screen. The applications are executed on a remote host and the host application icons are loaded and rendered on a mobile device screen. The images are formed on the remote host as a result of execution of the applications. The host is connected to cloud cache storage. The host loads application icons onto the cloud cache storage. The icon hashes are generated. When a mobile client needs to launch the host application, the corresponding icon hashes are used for locating the required application icons in the cloud cache storage and loading them to the client mobile device.

11 Claims, 8 Drawing Sheets

METHOD FOR LAUNCHING REMOTE APPLICATIONS FROM A MOBILE DEVICE USING CLOUD CACHE

BACKGROUND OF THE INVENTION

1. Field of the Invention

The present invention relates to remote computer access, and more particularly, to a method and system for controlling desktop applications remotely from a mobile device using a special cloud-based cache for application icons.

2. Description of the Related Art

The industry trend of using mobile devices and various tablets presents some challenges with regard to remote access to desktop/laptop computers. For example, a user wants to open an application on a remote desktop of a computer from his mobile device. However, the application window has to be encoded and provided to the mobile device in real-time. This presents a problem in the existing systems due to network bandwidth problems. A desktop, for the purposes of this description, is a large image with a set of icons placed over it. When a user clicks on the icon something happens. When the user can not load the icon, he has a blank space on the desktop and does not know what he can click.

The application window can be transferred to a mobile device in either compressed or uncompressed form using UDP protocol. Conventional systems experience traffic problems that affect real-time rendering of the application on a mobile device. The traffic from the host to a mobile client can be slow due to the fact that the host is unique and is located very far (in terms of network distance) from the mobile client. The traffic is significantly affected by transferring the icons located on the host Windows Taskbar or on the Mac DockBar.

Furthermore, the host can be off-line when the mobile client is running. The mobile client needs the host applications' data including the host desktop icons but cannot get them. Conventionally, the icons can be loaded using JSON-based (JavaScript Object Notation) data serialization format, which can also create traffic delays. Thus, if a user wants to work with an application executed remotely on a host computer from his mobile device, he cannot use the application in real time.

Accordingly, a system for real-time remote access of host applications from a mobile device using efficient desktop icon loading is desired.

SUMMARY OF THE INVENTION

The present invention is related to a method and system for working with the applications on the computer screen accessible remotely by a mobile device.

In one aspect, a method for using a mobile device to access remote host desktop applications is provided. A client mobile device is connected to a remote server (host) over a WAN. The client mobile device launches host desktop applications remotely and loads the application windows onto its screen. The mobile device is used to control applications and images. The applications are executed on a remote host and the host application icons are loaded and rendered on a mobile device screen. The images are formed on the remote host as a result of execution of the applications.

The host is connected to the cloud cache storage. The host loads application icons onto the cloud cache storage. The icon hashes are generated. When a mobile client requests to launch the host application, the corresponding icon hashes are used for locating the required icons in the cloud cache storage and for loading them onto the client mobile device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
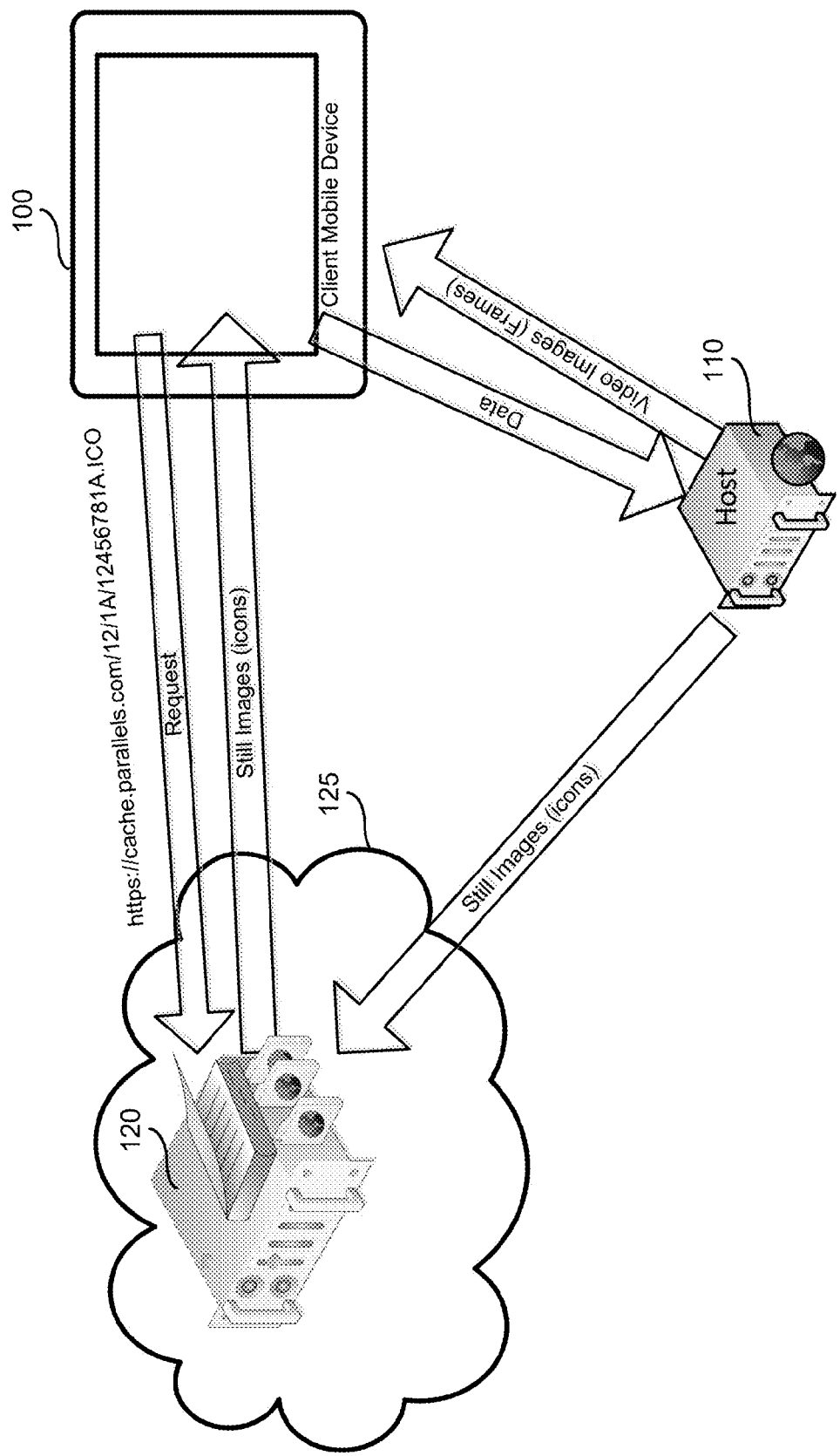
FIG. 1 illustrates an exemplary arrangement used for accessing host applications by a mobile device.

Reference will now be made in detail to the embodiments of the present invention, examples of which are illustrated in the accompanying drawings.

In one aspect, a method for using a mobile device to access remote host desktop applications is provided. A client mobile device is connected to a remote server (host) over a network, such as a LAN, WAN or a wireless network. The client mobile device launches host desktop applications remotely and loads the application windows onto its screen. The mobile device is used to control applications and images. The applications are executed on a remote host and screen images are rendered on the mobile device. The images are formed on the remote host as a result of execution of the host applications. The image can be just a desktop image. The image can display an application window on the desktop. The image can be a collection of icons (with or without a taskbar).

The host is connected to the cloud cache storage. The host loads application icons onto the cloud cache storage. When the application is installed on the host, the application icon(s) can be extracted from the installation packet and corresponding data is written to the system registry. Generally speaking, the host asks application for the icon(s) and the application provides them. The icon hashes are generated. When a mobile client launches the host application, the corresponding icon hashes are used for locating the required icons in the cloud cache storage and loading them onto the client mobile device.

When a mobile client begins using the system, he can request data about the host applications that is already stored in the system. The application icons can have substantial aggregate data volume. So, the host applications' data contains hashes of the icons instead. The actual icons are stored in the central icon storage. Thus, the disk space is advantageously saved. The host-related traffic is reduced, and the clients can see the host-related data even if the host is off-line.

According to the exemplary embodiment, the mobile device forms commands for controlling the applications running on a remote server. The applications are virtualized on the remote host server. The virtualization results are provided to the local computer in a form of video streams. According to the exemplary embodiment, a local desktop virtually represents a desktop of a remote computer as if the desktop were placed locally. In one embodiment, a desktop of a remote computer is reflected on the mobile or local device providing a user experience of a local device.

According to the exemplary embodiment, the host has a virtual desktop implemented on it. The virtual desktop can be accessed by different mobile device users. In other words, one host can contain several desktops of different users. In the exemplary embodiment, user data (commands) is processed and the application is launched on the host. The user receives results of execution of the application in a form of a current application window. Users want to work with the host desktop from a remote computer or mobile device. This requires implementation of a virtual desktop on the host.

In order to work with the host, the mobile client needs virtualization of the host desktop as a representation closest to the native representation of a user device. In one embodiment, the icons are adopted for rendering on the user device. For example, rectangular icons can be scaled down to other resolution or to the view with rounded corners. The image of the host desktop can be half-transparent or partially transparent. The icons of available applications have to be shown on the desktop. In one embodiment, the icons can be scaled down and shown on the user mobile device as the Taskbar or the DockBar panel.

Selection of active host applications or the host applications to be launched is implemented on the mobile client. The mobile client has its own application control module (desktop manager) that uses the panel interface. The application control module does not require a lot of resources, but it needs a visual representation of the host applications in a form of icons.

The host can be off-line when the mobile client is running. The mobile client needs host applications' data including the host desktop icons. FIG. 1 illustrates an exemplary arrangement used for accessing host applications by a mobile device. According to the exemplary embodiment, the icons are sent from the host to a cloud web cache 120. The cloud web cache 120 can be an FTP server or servers. The cloud web cache 120 is used when the mobile client 100 and the host 110 are located far from each other within the Internet. If the client 100 and the host 110 are located within a local network, the mobile client 100 can load the icons from the host 110 directly.

However, even in this situation, if a large number of clients access the host, loading icons taken from each client profile located on the host is not efficient. Furthermore, the icon-related data is not required for normal host operation and takes a lot of disk space. Therefore, the icon-related data is transferred into the cloud cache 120 by the host 110 in a form of still images, animated GIFs or images with other kind of scripts.

The mobile client 100 can request the icons from the cloud cache and receive them as still images. The mobile client 100 logs into the host 110 and receives the host application windows (see FIG. 2) as a video stream. According to the exemplary embodiment, the cloud cache 120 is a common server or a group of servers (or FTP servers) that can be accessed without any traffic concerns. The cloud cache 120 can be a cloud server or a group of proxy servers optimized for storage of icon-related data with a minimal delay time. The icon-related data can be icon and file name in a form of hash. The icon-related data can be an OS-specific data, as well. For purposes of this description the storage is referred to as a cloud server or a cloud cache.

According to the exemplary embodiment, the icons are associated (linked) to corresponding applications. The icons are linked to the corresponding applications based on the hash value. The icons are store in the storage as files having their names as corresponding hashes. In other words, the icons are directly referenced by their hashes. First two symbols of each hash are used for a first level catalog and two of the last symbols indicate a second level catalog. Thus, the icons are organized into a two-level catalog in the cloud cache. Selection of an icon in a catalog based on the hash is simple and consumes few resources. The hashes are close enough to random numbers, which provides for a well-balanced structure of the file system catalogs. This, in turn, provides for a fast file access.

A file or another container for an icon is named by a hash value. The icon is selected from the catalog based on exact hash matching. Coincidence of hashes of different icons is highly unlikely. According to the exemplary embodiment, the same icons with the same hashes are automatically detected even if the icons correspond to different applications or to the same applications belonging to desktops of different users.

According to the exemplary embodiment, a mobile client application logs into the host and initiates a remote desktop mode of the host. The host forms a list of available applications (or files associated with the client) represented by the icons and sends the hashes of these icons to the client. Note that usually there are no icons on the application window. The icons are placed on the desktop wallpaper under the applications' windows. The client application forms a control panel with the loaded icons. The control panel can display a common symbol instead of icons that have not been loaded. The icon request and subsequent transfer of the icons can take significant time (e.g., 0.1-0.5 second, 10 icons can take up to 1 second) due to a large volume of the icons and to a large number of the icons.

This is resolved by storing the icons in the central cloud cache. A mobile client can save a configuration data received from the host as hash located on the cloud storage. The cloud storage can save names of the applications and corresponding icon hashes. Thus, this configuration data can be re-used automatically, instead of waiting for it from the host. The actual icons can be loaded from the cloud storage as well.

According to yet another exemplary embodiment, host application data and client application and file data can be represented by hashes and visualized by the icons on the user mobile device. The icons are downloaded to the mobile device over the network channel. This also reduces traffic. For example, in order to call a host application or to open a host file, the user mobile device sends a corresponding hash to the host.

According to the exemplary embodiment, the client application makes a request to the cloud server for loading the icon images and receives the corresponding data from the cloud server. For example, the icons shown on the screen can be requested first. The icons can be rendered on the screen as corresponding hashes are received.

According to the exemplary embodiment, a memory allocated for cashed icons can be smaller than the aggregated volume of the icons used. In this case, the client device stores hashes and the corresponding icons are loaded on as need basis. This also reduces the host traffic. Note that in addition the icon hashes can have corresponding application (or files) names or other metadata. When a user selects an icon of an application (or a file), the corresponding data is sent to the host 110. The host 110 launches an application corresponding to the icon or the application associated with the file. Then, the host 110 forms an image of a remote desktop. Note that the image of the remote desktop can be scaled down to fit the screen of the mobile user device 100. In this case, the Taskbar has the icons of the stable size, which does not scale.

According to one exemplary embodiment, the icon request can be implemented in a safe mode. A request of an icon in a hash form does not reveal any properties of the actual application (a name or a version of the application). The actual icon, unlike a hash, can reveal a version of the application by its color or shape. When a host has a large number of users, the host traffic is significantly reduced when all of the icons are stored in the same cache. A number of the icons (except for the user defined icons) are somewhat limited. Thus, the icon cache can be distributed over proxy servers in a complete form.

According to one exemplary embodiment, the icons are generated by the host on-the-fly and sent to the cloud cache. The host primarily generates icons from the applications. If the host cannot get the icons from the application, it uses generic icons. Each operating system has its own generic icons. Alternatively, the icons are formed as new applications and files are loaded onto the host. In one embodiment, the host can have a list of applications having corresponding icons loaded into the cloud cache along with the list of corresponding hashes.

According to one exemplary embodiment, the host has several application versions that have the same corresponding icons. The host can process some data remotely and provide it to the mobile user as graphic data stream, while other data is processed locally by a local application. For example, a major portion of a processor time and memory is used for decompression of host images. Therefore, the resources are not sufficient for all of the icons required by the applications' user. Thus, the icons are loaded from the cloud cache storage.

In one exemplary embodiment, the icons can be of a different size depending on a type of a mobile device. According to the exemplary embodiment, user profiles need to be synchronized. If the same user employs different mobile devices to connect to the host, the different sets of icons can be formed for different devices of a single user profile. The user mobile device ID is acquired and the screen resolution is determined. Then, the icons with the sizes corresponding to the screen resolution are provided. If a connection to the host requires synchronization, the icons are loaded as a background process.

Figure 2:
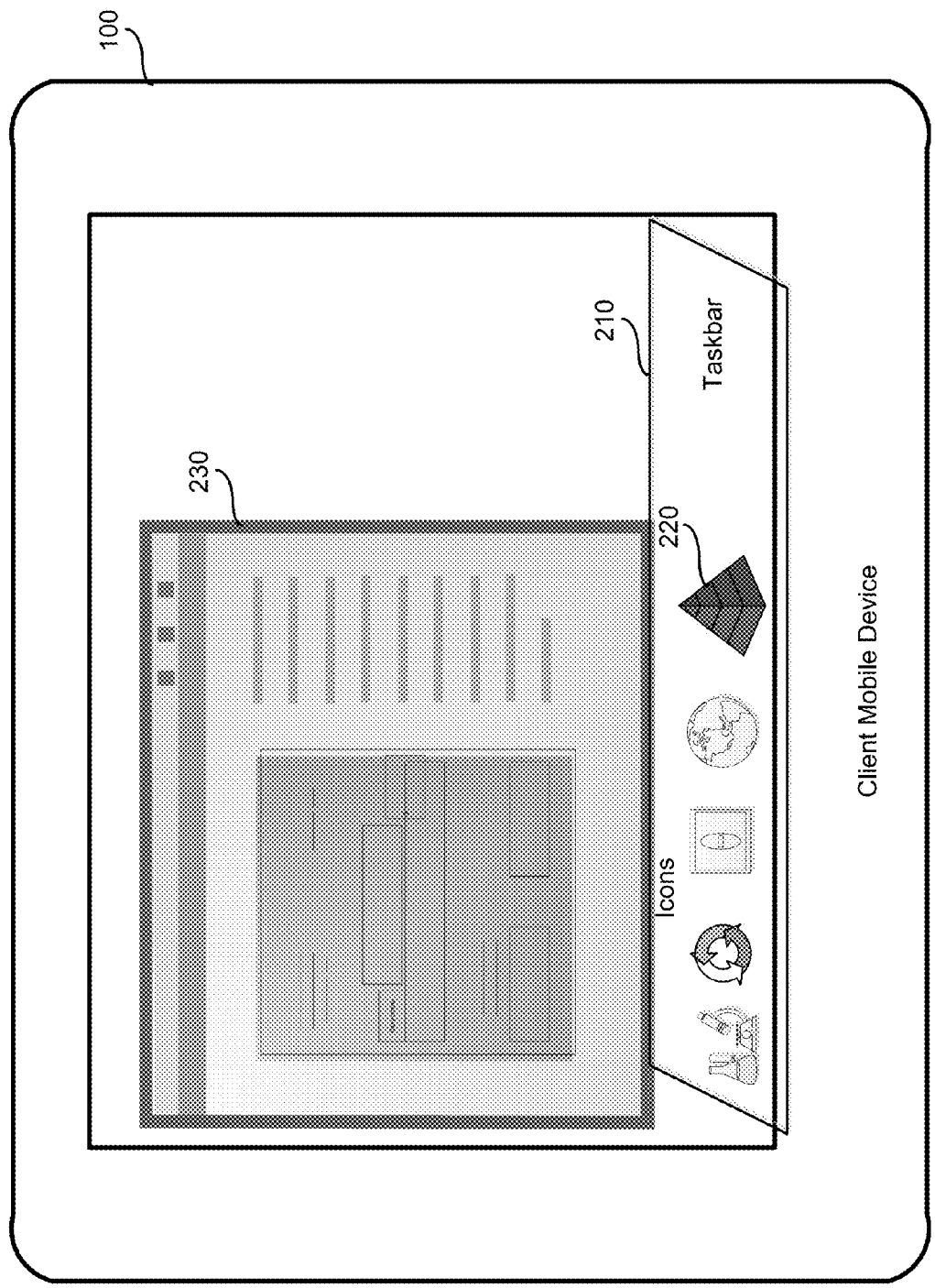
FIG. 2 illustrates a client mobile device with a host application window, in accordance with the exemplary embodiment.

FIG. 2 illustrates a client mobile device with a host application window, in accordance with the exemplary embodiment. The client mobile device 100 has a window 230 of an application executed on the host 110 displayed on its screen (see FIG. 1). The mobile device 100 screen also displays a taskbar 210 with loaded icons 220.

Figure 3:
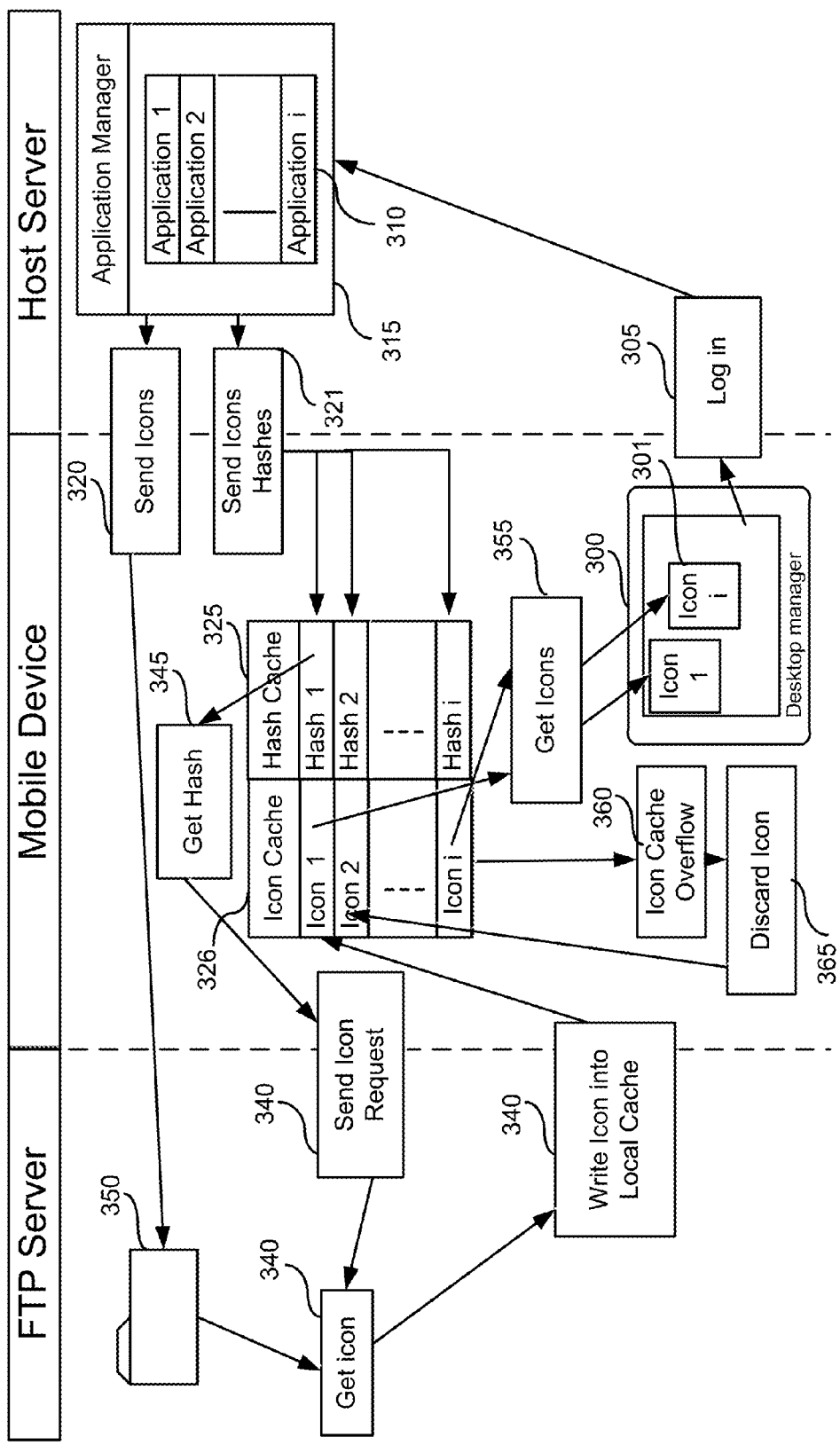
FIG. 3 illustrates a workflow of a method for caching the application icons and loading them onto a mobile device, in accordance with the exemplary embodiment.

FIG. 3 illustrates a workflow of a method for caching the application icons and loading them onto a mobile device, in accordance with the exemplary embodiment. A mobile device desktop manager 300 logs in the host server running an application manager 315. The application manager 315 determines host applications 310 associated with the mobile device user account. The application manager 315 sends the application icons (block 320) to a cloud cache 350 located on the FTP server. Subsequently, the application manager generates hashes of the icons and sends the hashes (block 321) to a hash cache 325 located on the mobile device.

When the mobile device needs to get a hash of the icon (block 345), the hash is acquired from the hash cache 325. Subsequently the mobile device sends icon request (block 330) to the cloud storage on the FTP server. The FTP server gets the corresponding icon (block 335) from the icon cache 350. Then the icon is written (block 340) into local icon cache 326 on the mobile device. Note that any kind of a server can be used. A network storage or a network file server or a set of storages/servers in a form of distributed cloud can be used, as well.

If the local icon cache 326 is full, the icon overflow (block 360) is detected and the icon is discarded (block 365). Otherwise, the corresponding icon from the local icon cache 326 is retrieved (block 355) and provided to the desktop manager 300 for displaying on the mobile device screen. Subsequently a mobile device user can select an application icon on the mobile device screen and view a corresponding application window (as shown in FIG. 2).

Figure 4:
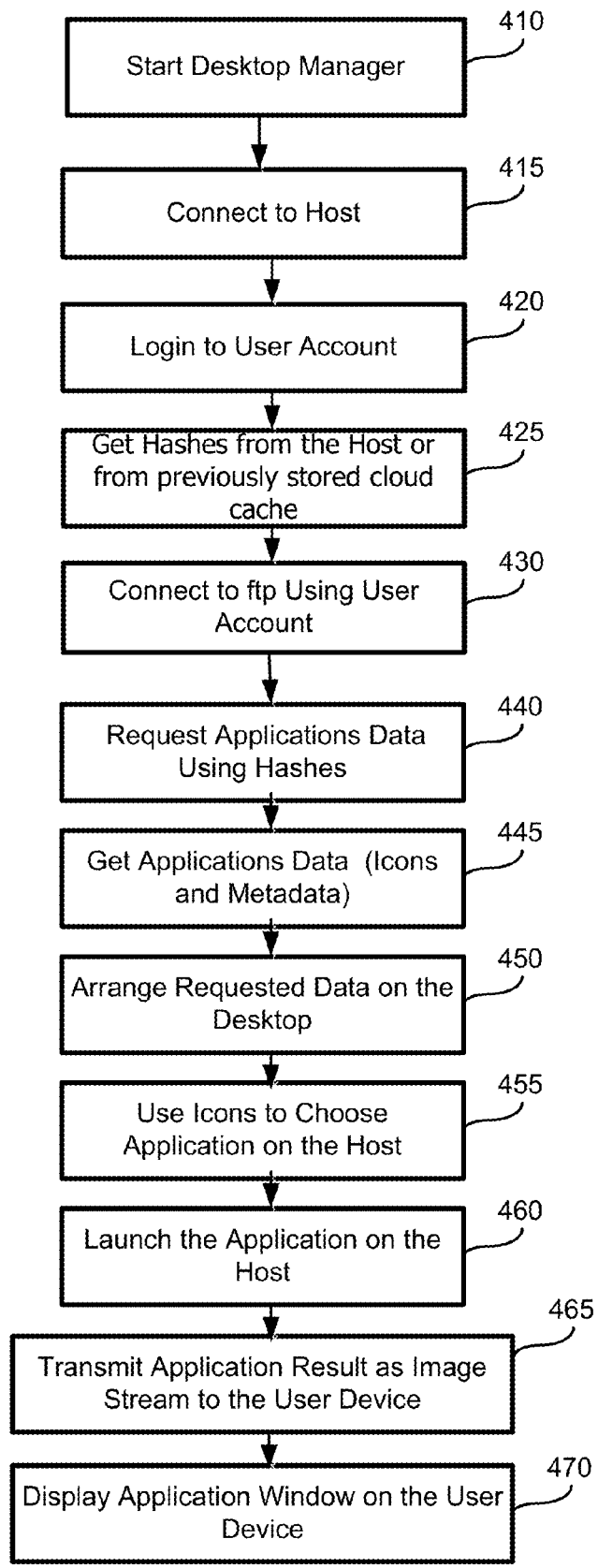
FIG. 4 illustrates a flowchart of a method in accordance with the exemplary embodiment.

FIG. 4 illustrates a flowchart of a method in accordance with the exemplary embodiment. A desktop manager application is started on a mobile device in step 410. The mobile device is connected to the host in step 415. In step 420, the mobile device logs into a user account on the host. The mobile device gets icon hashes from the host in step 425. The mobile device connects to an FTP server using the user account in step 430. In step 440, the mobile device requests application data (icons) using the hashes obtained in step 425. The mobile device obtains applications icons based on the hashes in step 445. The desktop manager arranges the icons on the desktop in step 450.

The mobile device user selects the host application using the icon(s) in step 455. The selected application is launched on the host in step 460. The host transmits the application execution results to the mobile user device as an image stream in step 465. Subsequently the application window is displayed on the screen of the mobile device in step 470.

Figure 5:
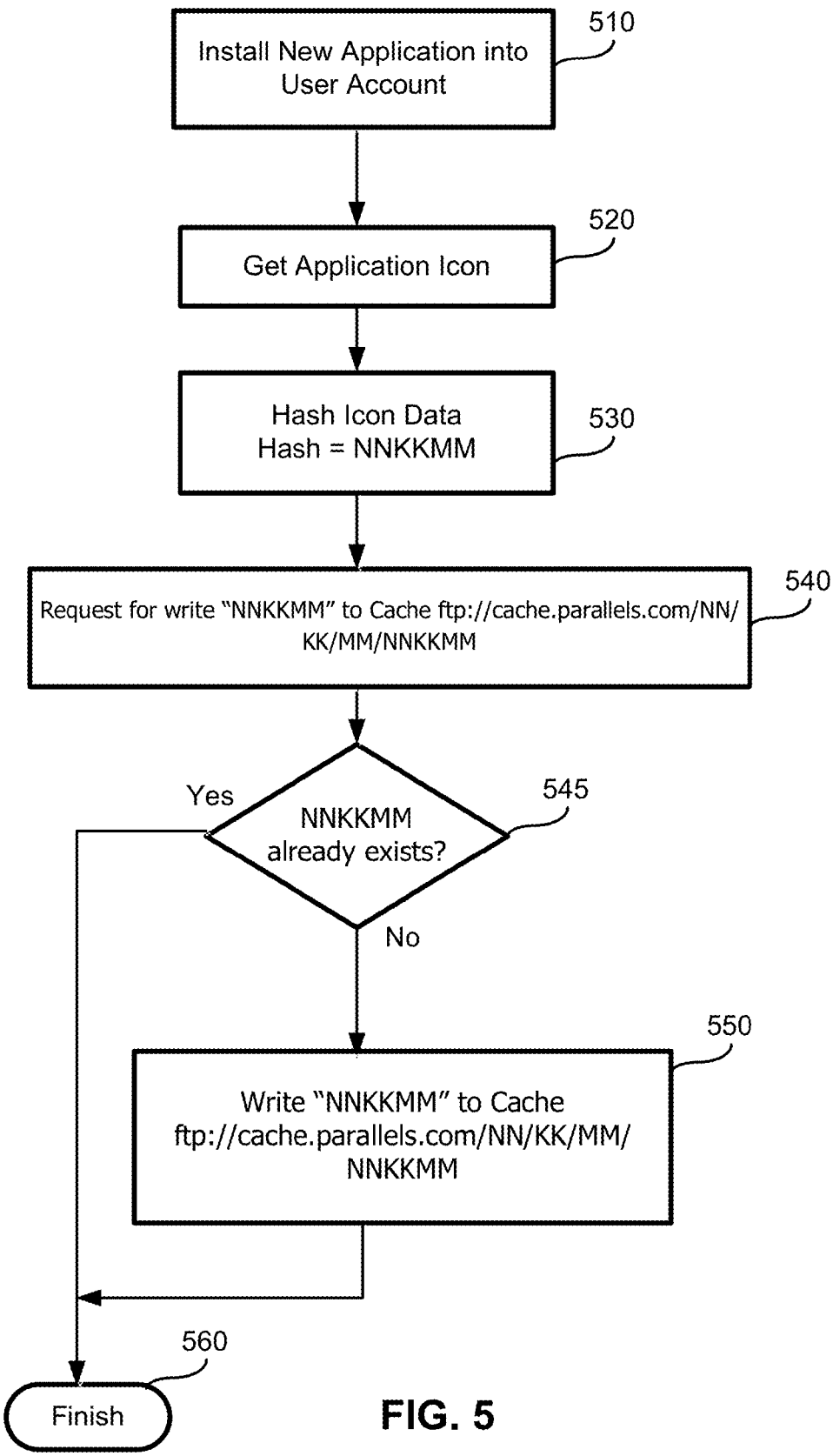
FIG. 5 illustrates a flow chart of a method for storing the icons in the cloud cache, in accordance with the exemplary embodiment.

FIG. 5 illustrates a flow chart of a method for storing the icons in the cloud cache, in accordance with the exemplary embodiment. In step 510, a new application is installed on the host into a user account. The application icon is obtained in step 520. The icon data is hashed in step 530. The host requests to write the icon hash to a cloud cache in step 540. The process checks, in step 545, if the hash already exists in the cloud cache. If the hash already exists, the process is finished in step 560. Otherwise, the hash is written into the cloud cache in step 550.

Figure 6:
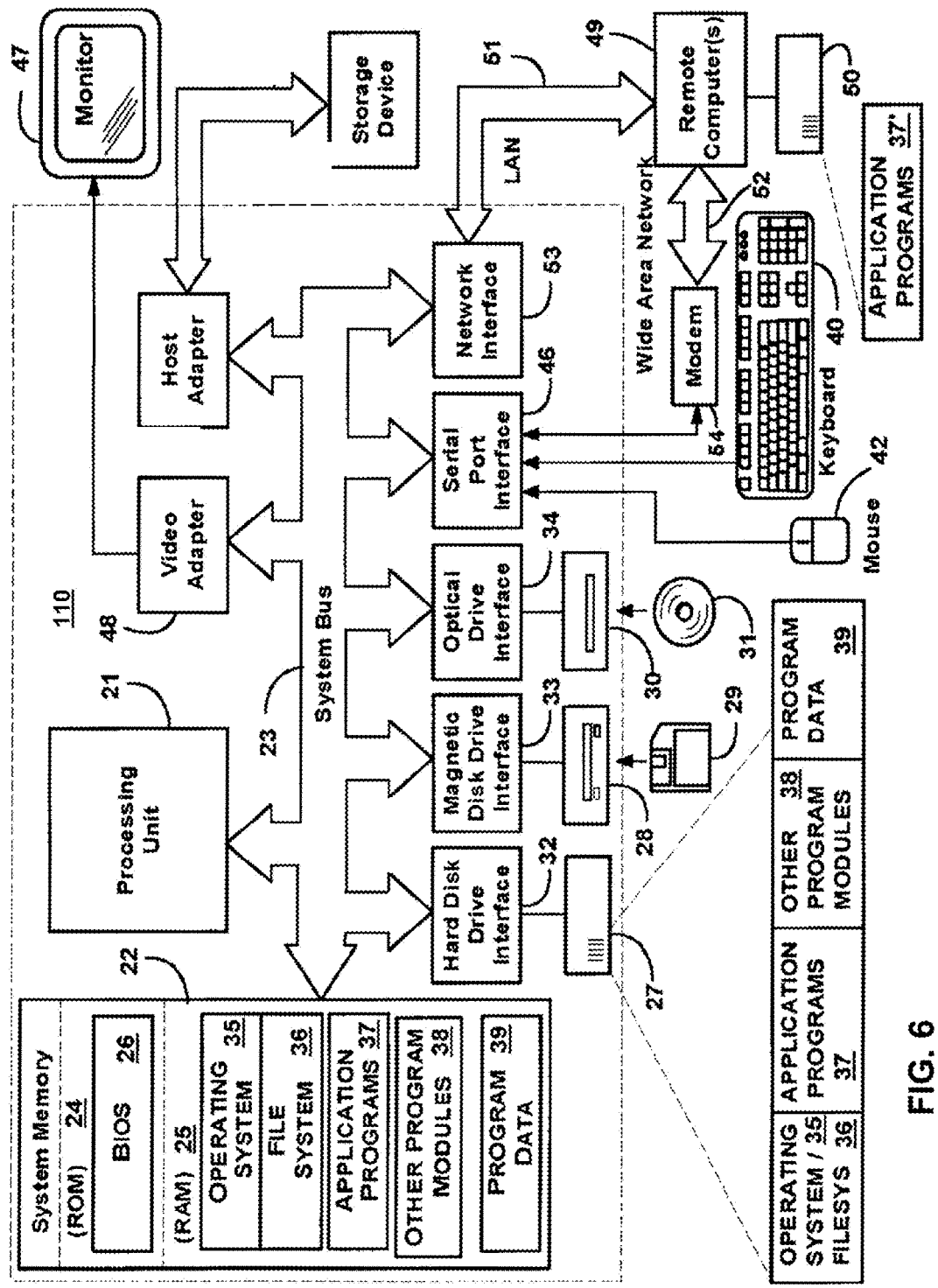
FIG. 6 illustrates a schematic diagram of an exemplary computer or a host server that can be used in the invention.

For example, and icon with hash "ABCD" can be stored as a file "ABCD" in subfolder "D" in subfolder "A" in any root folder or subfolder where subfolder "E" is located for an icon with hash "EFGH" where subfolder "D" with file "EFGH" is stored. The letters "A-H" can be numbers of the hex code With reference to FIG. 6, an exemplary system for implementing the invention includes a general purpose computing device in the form of a host computer or server 110 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 110, such as during start-up, is stored in ROM 24. The host computer 110 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the host computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 110 includes a file system 36 associated with or included within the operating system 35, such as the WINDOWS NT™ File System (NTFS), one or more application programs 37, other program modules 38 and program data 39. A user may enter commands and information into the personal computer 110 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 110 may operate in a networked environment using logical connections to one or more remote computers 49. The remote computer (or computers) 49 may be another personal computer, a server, a router, a network PC, a peer device or other common network node, and typically includes many or all of the elements described above relative to the computer 110.

The computer (host) 110 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer/host 110 is connected to the local area network 51 through a network interface or adapter 53. When used in a WAN networking environment, the personal computer 110 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer 110, or portions thereof, may be stored in the remote memory storage device. It will be appreciated that the network connections shown are exemplary and other means of establishing a communications link between the computers may be used.

Figure 7:
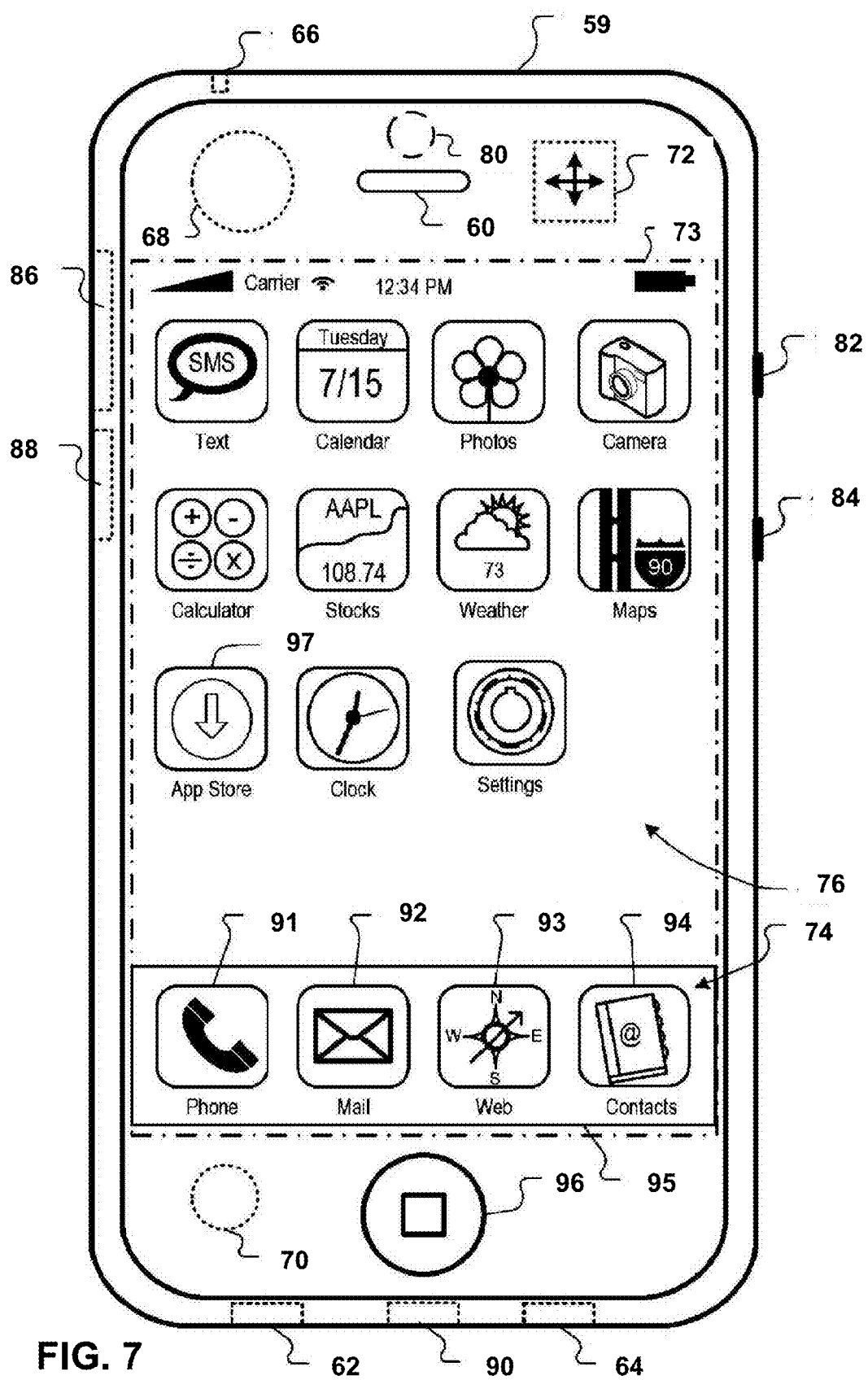
FIG. 7 is a block diagram of an exemplary mobile device that can be used in the invention.

FIG. 7 is a block diagram of a mobile device 59 on which the invention can be implemented. The mobile device 59 can be, for example, a personal digital assistant, a cellular telephone, a network appliance, a camera, a smart phone, a tablet, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, functionality of each corresponding device may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 8:
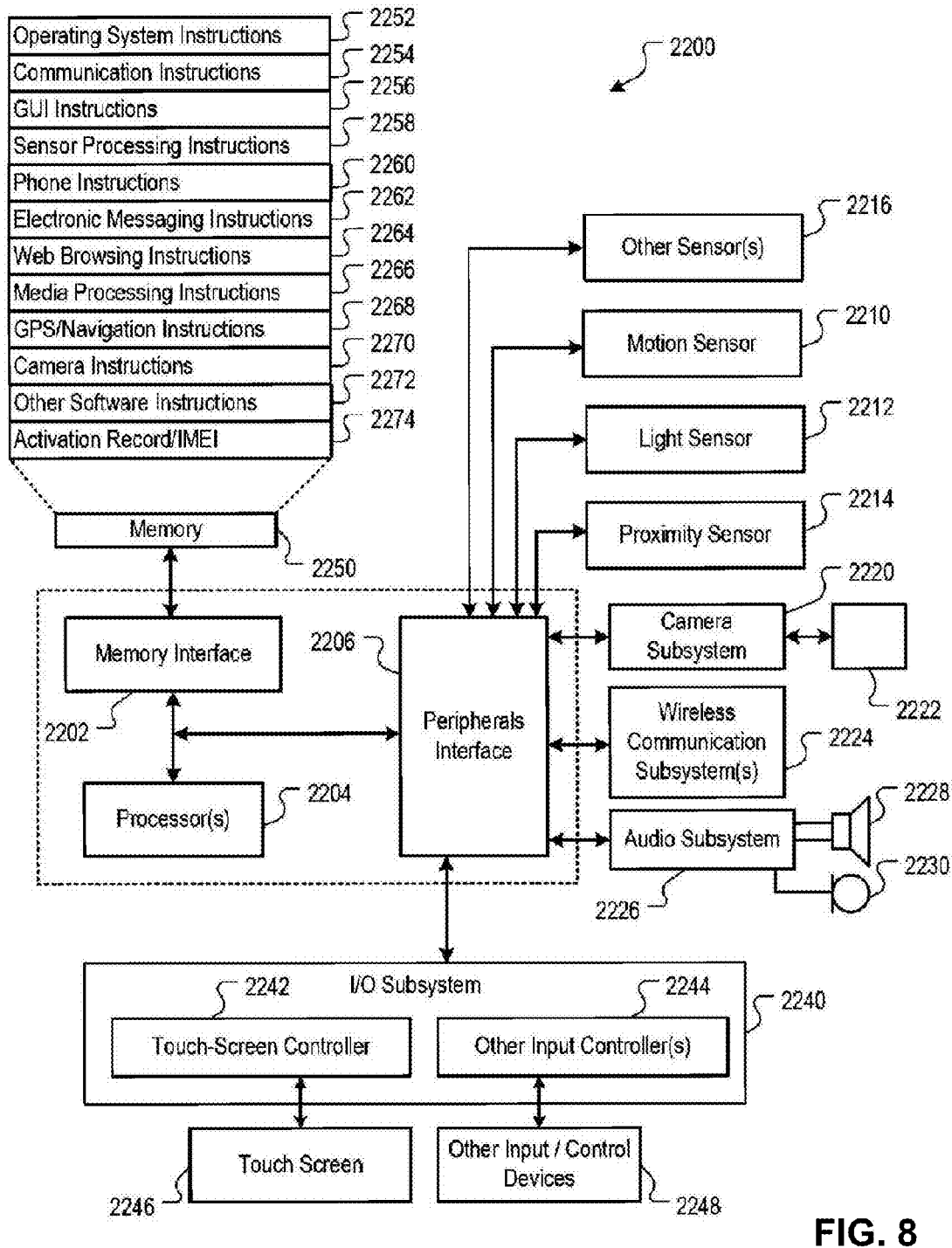
FIG. 8 is a block diagram of an exemplary implementation of the mobile device.

FIG. 8 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described the different embodiments of a system and method, it should be apparent to those skilled in the art that certain advantages of the described method and apparatus have been achieved. In particular, it should be appreciated by those skilled in the art that the proposed method provides for remote access of host applications by a user mobile device and efficient use of the icons of the host applications on the mobile device.

It should also be appreciated that various modifications, adaptations, and alternative embodiments thereof may be made within the scope and spirit of the present invention. The invention is further defined by the following claims.

What is claimed is:

1. A computer-implemented method for accessing applications on a remote host from a mobile device, the method comprising:
   (a) compiling a catalog of icons of the applications along with hash values of the icons of the applications generated by hashing the icons;
   (b) distributing the catalog over a cloud to form a cloud server cache of the icons of the applications along with the hash values of the icons of the applications;
   (c) starting a remote desktop manager on the mobile device;
   (d) connecting the mobile device to the remote host;
   (e) logging into a user account on the remote host from the mobile device;
   (f) on the remote host, generating host application data along with an application icon;
   (g) calculating a hash value of the application icon;
   (h) requesting, using the mobile device, host application data from the remote host;
   (i) transmitting the hash value of the application icon along with the application data to the mobile device;

(j) on the mobile device, obtaining the application icon hash from the remote host;
(k) connecting the mobile device to a cloud server cache using the user account;
(l) requesting application icons by the mobile device from the cloud server cache using the application icon hash;
(m) receiving into the mobile device the application icon corresponding to the application icon hash;
(n) arranging the application icon along with other icons of the applications on a mobile device screen;
(o) launching a host application on the remote host by using a corresponding application icon from the application icons located on the mobile device screen;
(p) receiving a result of execution of the host application on the mobile device;
(q) displaying a host application window, including displaying the result of execution of the host application, on the mobile device screen by the remote desktop manager;
(r) checking by a host agent of the cloud server cache whether host application icons with appropriate hashes are available; and
(s) uploading any missing host application icons into the remote host from the cloud server cache and organizing folders for storing the missing host application icons and corresponding files based on parts of randomly generated hashes,
wherein the hashes of the application icons are stored in a mobile device hash cache after obtaining the hashes of the application icons from the remote host.

2. The method of claim 1, wherein the host application is associated with the user account.

3. The method of claim 1, wherein the cloud server cache is an ftp (File Transfer Protocol) server.

4. The method of claim 1, wherein the application icon hashes are generated on the remote host.

5. The method of claim 1, further comprising writing the application icons into a mobile device icon cache.

6. The method of claim 5, further comprising discarding the application icons, if an overflow of the icon cache occurs.

7. The method of claim 5, further comprising checking if the application icon hash already exists in the mobile device hash cache prior to storing the application icon hash in the mobile device hash cache.

8. The method of claim 1, wherein the icons are sent to the cloud server cache by the remote host upon receiving the request from the mobile device.

9. The method of claim 1, wherein displaying the host application window on the mobile device screen comprises processing a video stream received from the remote host.

10. A mobile device-based system for accessing applications on a remote host, the system comprising:
   a processor;
   a memory coupled to the processor;
   a computer code logic stored in the memory and executed on the processor, the computer code logic for implementing the steps (a)-(s) of claim 1.

11. A computer-implemented method for accessing host applications on a remote host from a mobile device, the method comprising:
   (a) launching a remote desktop manager on the mobile device;
   (b) connecting the mobile device to the remote host residing on a cloud;
   (c) generating icon hashes corresponding to icons of host applications of the remote host and storing the icon hashes in a cloud server cache that is accessible by multiple users, wherein
   first two symbols of each icon hash are used for a first level catalog and last two symbols of the icon has indicate a second level catalog;
   (d) arranging the icon hashes into a two-level cloud server cache catalog;
   (e) selecting, by the user mobile device, a host application of the remote host and obtaining corresponding host application icon hashes from the two-level cloud server cache catalog;
   (f) receiving into the mobile device the selected host application icons corresponding to the application icon hashes;
   (g) launching the host application from the mobile device by using a corresponding application icon;
   (h) displaying a host application window on the mobile device screen by the remote desktop manager, including displaying, in the host application window, results of execution of the host application;
   (i) storing the application icon hashes in a mobile device hash cache;
   (j) uploading any missing host application icons to the remote host from the cloud server cache and organizing folders for storing the missing host application icons and corresponding files based on parts of randomly generated hashes, and
   (k) repeating steps (a)-(j) for another user mobile device.

* * * * *